Figure 3:
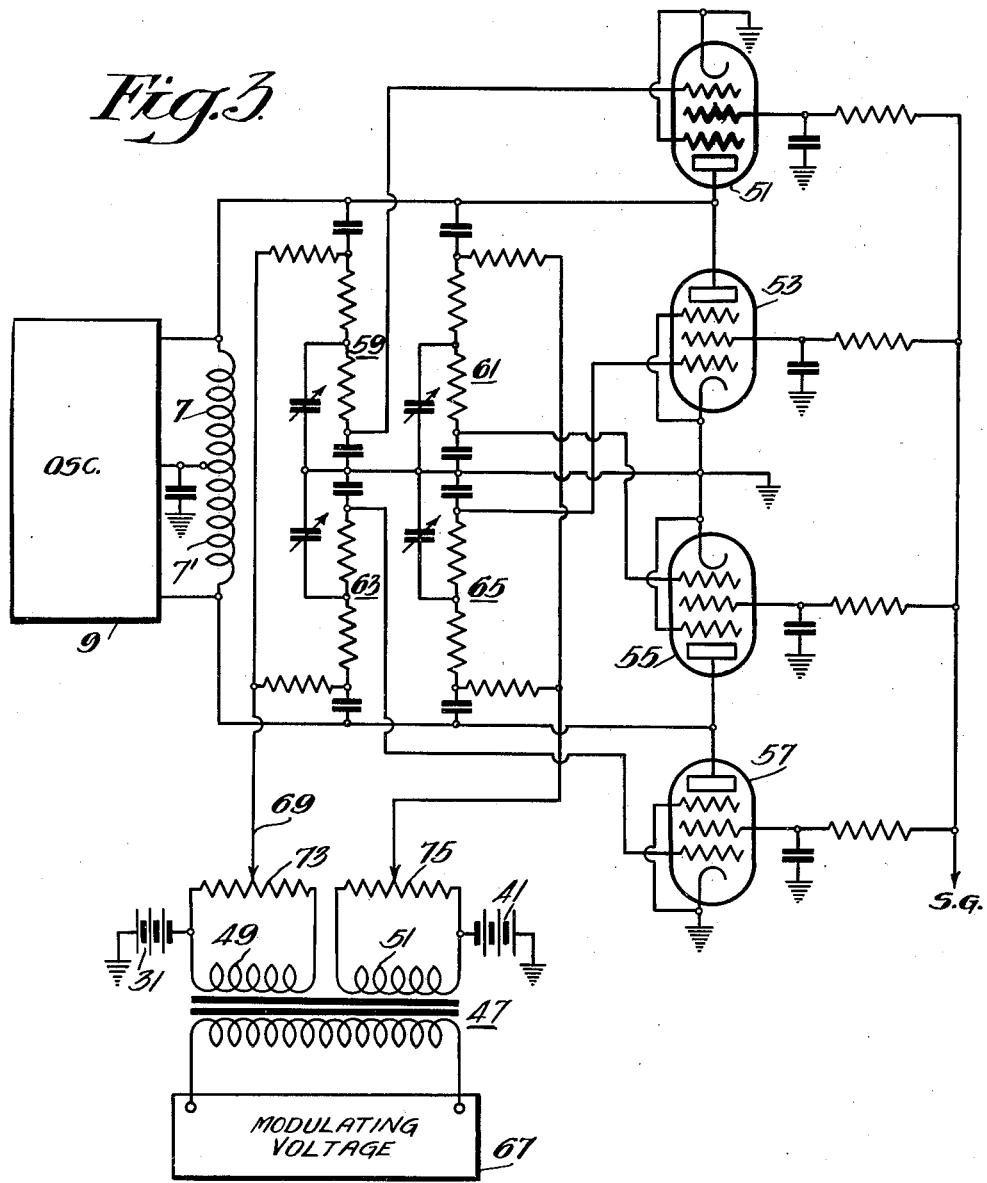

July 8, 1941.  L. C. SMITH  2,248,132
FREQUENCY MODULATION
Filed Jan. 27, 1940  2 Sheets-Sheet 1
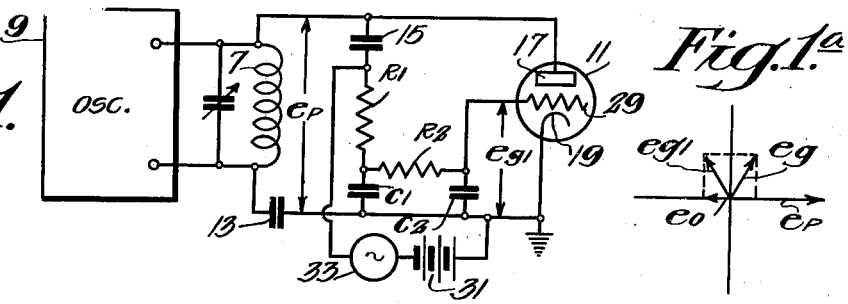
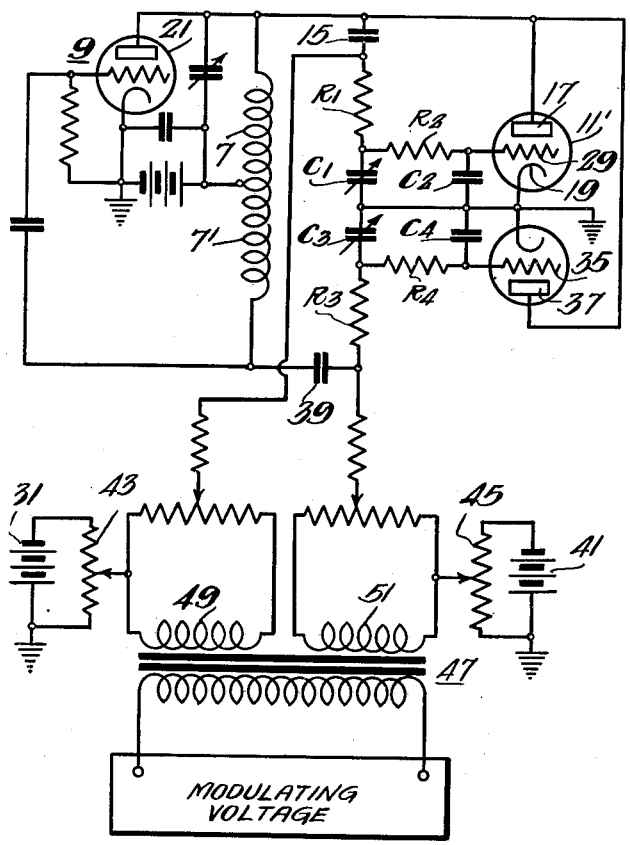
Inventor
Lester C. Smith
By
Attorney July 8, 1941.   L. C. SMITH   2,248,132
FREQUENCY MODULATION
Filed Jan. 27, 1940   2 Sheets-Sheet 2

Inventor
Lester C. Smith
By
Attorney

Patented July 8, 1941

2,248,132

UNITED STATES PATENT OFFICE 2,248,132

FREQUENCY MODULATION

Lester C. Smith, Haddonfield, N. J., assignor to Radio Corporation of America, a corporation of Delaware Application January 27, 1940, Serial No. 315,885

10 Claims. (Cl. 179—171.5)

This invention relates to variable reactance circuits of the electron tube type, and more particularly to an improved method of and means for reducing the loading effect of the reactance tube on the controlled circuit, and for producing a greater change of reactance than has been possible heretofore.

The use of reactance tubes to control the resonant frequency of an oscillatory circuit is well known. Briefly, the effect is produced by inducing reactive components of current in the controlled circuit by means of the reactance tube. The reactive components may either lead or lag the normal currents of the controlled circuit, to produce effects which are respectively equivalent to connecting a capacitor or an inductor in parallel with the controlled circuit. Systems of this type are described in a copending application of Murray G. Crosby, Serial No. 209,919, filed May 25, 1938.

The anode and cathode electrodes of the reactance tube are connected directly or coupled to the controlled oscillatory circuit. Thus, the tube will absorb power from the oscillatory circuit. That is, when the reactance tube is connected across the tank circuit of an oscillator, the oscillatory voltage varies the anode-cathode voltage of the reactance tube, and a current flows in the anode circuit of the reactance tube which is in phase with the oscillatory voltage and which is, therefore, equivalent to the current in a resistive load connected across the oscillator. The amplitude of this current varies inversely as the plate resistance of the reactance tube, thus causing a variation of the amplitude of oscillation when its frequency is varied, which is highly undesirable. It is one object of this invention to reduce the resistive loading effect of the reactance tube by phasing the grid voltage of the reactance tube so that it has a component in phase opposition to the alternating anode voltage.

The above identified Crosby application suggests connecting two reactance tubes in parallel which have opposite reactive effects, and varying their mutual conductance in opposite directions so that the two tubes produce an accumulative net result. As an extension of this arrangement it is a further object of this invention to operate the two reactance tubes as class B amplifier tubes so that the anode current of one tube is biased off when the other tube is functioning. In this manner one tube provides an effective shunt inductive reactance to the oscillatory circuit while the other tube provides an effective shunt capacitive reactance. The advantage of this arrangement is that each tube is operating only half of the time, thus reducing its average power consumption and its heat dissipation.

In circuits of the general type being considered, the amplitude of the quadrature grid voltage must be large with respect to the anode voltage if a substantial change of reactance is to be obtained. It is a still further object of this invention to provide a phase shifting network which develops a voltage of the desired phase and represents a minimum attenuation of amplitude.

A more complete understanding of the invention will be obtained by consideration of the following description in connection with the accompanying drawings.

Referring to the drawings, Fig. 1 is a simplified circuit diagram showing my improved phase shifting circuit; Fig. 1a is a vector diagram used in explaining the operation of the circuit; Fig. 2 is a circuit diagram of a practical embodiment of this invention; Fig. 2a is a vector diagram used in explaining the operation of the circuit illustrated in Fig. 2; and Fig. 3 is an alternative arrangement using four reactance tubes in a combined push pull circuit. Similar reference numerals refer to similar elements throughout the several drawings.

Referring now to Fig. 1, an inductor 7 is the tank circuit inductor of an oscillator 9, the resonant frequency of which is to be varied, and across which an oscillatory voltage is developed. It is to be understood, however, that the variation of the frequency of an oscillator is merely illustrative of one use of the reactance tube, and is not to be construed as a limitation. The anode 17 and cathode 19 of a reactance tube 11 are connected in parallel with the inductor 7, the blocking capacitor 13 serving to isolate the cathode of the reactance tube from the D. C. anode voltage. A blocking capacitor 15 of low impedance at the operating frequency couples the anode 17 to a phase shifting network which includes resistor R1 and capacitor C1 serially connected with the coupling capacitor 15 across the inductor 7; and resistor R2 and capacitor C2 which are serially connected across capacitor C1. The grid 29 of the reactance tube is connected to the junction of R2 and C2. A fixed bias source 31 and an alternating control voltage generator 33 are serially connected between ground and the junction of capacitor 15 and resistor R1.

The impedances of the two resistors R1, R2, and the two capacitors C1, C2 are preferably made substantially equal at the operating frequency. Consequently, the phase shift produced by C1R1 is approximately 45°, and a further phase shift of like amount is produced by C2R2. By increasing or decreasing the reactance of one or both of the capacitors the net phase shift may be made a little less than or a little greater than 90°, as desired. It will be recognized that a single resistor-capacitor combination cannot produce a phase shift in excess of 90°. In addition to providing a voltage whose phase may be shifted above or below 90°, the purpose of which will be discussed subsequently, the illustrated phase shifting network has the added advantage of providing a phase-shifted voltage of much greater amplitude than that which could be obtained with a single resistor and capacitor. The advantage of this is that the reactive effect of the tube is increased, thus making possible a greater variation of frequency for a given change in the gain of the reactance tube.

The single resistor-capacitor network of the prior art produces a phase-shifted output voltage of small amplitude because the ratio of the reactance to the resistance must be large in order to produce the required 90° phase shift. Thus, when the grid voltage is the voltage drop across the capacitor, considering only R1, C1, in Fig. 1, for example, the reactance of C1 must be small with respect to the resistance of R1, and the voltage across C1 will be correspondingly small. When C1 and R1 are interchanged and the grid voltage taken as the drop across R1, then R1 must be small with respect to C1, and again the grid voltage is correspondingly small. What is more important, the resultant phase shift is proportional to the ratio of reactance to resistance, so that in practice it becomes very difficult to obtain any appreciable voltage when a phase shift approaching 90° is desired. Consequently a compromise is made between the amount of phase shift and the amplitude of the voltage, and an intermediate value chosen which is considerably less than 90°. I have found, however, that the phase angle should be greater than 90° for reasons which will become apparent upon consideration of the vector diagram of Fig. 1a, to which reference is now made.

The vector $e_p$ represents the oscillatory voltage which is impressed by the controlled circuit between the cathode and the anode of the reactance tube. As indicated above this voltage tends to produce a varying current in the reactance tube which is equivalent to that taken by a resistive load, and consequently represents pure loss so far as the desired reactive effect is concerned. The vector $e_g$ represents the conventional grid voltage whose phase is less than 90°. It will be noted that there is a component of the grid voltage $e_g$ which is in phase with the anode voltage $e_p$ and which greatly increases this undesired resistive anode current since its effect is amplified by the amplification of the tube. In accordance with this invention, a voltage represented by the vector $e_{g1}$ is applied to the grid whose phase with respect to the anode voltage is greater than 90°. For the same reactive component, the voltage $e_{g1}$ has a component $e_o$ which is in phase opposition to the anode voltage, so that the plate impedance of the tube varies inversely as the anode voltage, and the effect of the varying anode voltage may be completely neutralized. The change in the impedance of the reactance tube connected across the oscillator is, therefore, essentially reactive, and changes in the amplitude of the oscillatory voltage due to the changing anode voltage are eliminated. In fact, the tube may be over-compensated to a certain extent, so that it has a negative resistance characteristic. It is to be understood, of course, that the above described improvement may be practised with either a leading or a lagging grid voltage.

Fig. 2 represents a practical application of this feature of my invention to a push-pull arrangement which also employs class B operation in accordance with a further object of this invention. Oscillator 9 comprises a conventional triode 21 the plate circuit of which includes inductor 7. A second inductor 7' is closely coupled to inductor 7 for developing an out of phase voltage. Preferably the two inductors 7 and 7' consist of a tapped helix. The open end of inductor 7' provides the necessary feedback voltage for the oscillator, or it may be connected to the anode of a second push-pull connected oscillator.

The first reactor tube 11' is connected to the phase shifting network R1—C1, R2—C2 and the inductor in exactly the same manner as tube 11 of Fig. 1. A second reactor tube 35 has its anode 37 connected directly to the anode 17 of the first reactor tube, and its grid electrode connected to a phase shifting network R3—C3, R4—C4 which is coupled by means of capacitor 39 to the high voltage end of inductor 7'. While the phase shift of the networks R3—C3, R4—C4 is less than 90°, as will be subsequently explained, the two step arrangement shown is preferred to the single capacitor-resistor network because a larger voltage is available.

The fixed grid biases for the two reactance tubes are obtained, respectively, from batteries 31 and 41 and potentiometers 43 and 45. Alternating voltages of opposite phase are superimposed on the reactance tube grids by means of a transformer 47 having two secondary windings 49 and 51.

Referring to the vector diagram of Fig. 2a, $e_1$ is the voltage across inductor 7 which is impressed between the cathode and anode electrodes of both reactance tubes. Vector $e_2$ is the voltage of opposite phase developed across inductor 7'. Vector $e_{g1}$ is the phase shifted voltage applied to the grid of the first reactor tube 11', leading the voltage $e_1$ by more than 90°. Vector $e_{g2}$ is the voltage applied to the grid of the second reactor tube 35, and which is derived from $e_2$. It will be noted that in this case the total phase shift from $e_2$ to $e_{g2}$ is less than 90° so that the grid voltage $e_{g2}$ will be displaced more than 90° from the anode voltage $e_1$. Consequently, the resistive component of anode current in both tubes due to the anode voltage $e_1$ will be neutralized in the manner explained above with respect to Fig. 1a.

While it is to be understood that the fixed bias potentials which are applied to the reactance tubes are preferably separately adjustable, so that the operating points of the tubes may be adjusted each to the point which produces the most nearly linear change of frequency, it is, of course, entirely practical to apply the same bias to the two tubes. The actual value of the bias is preferably sufficient to reduce the anode currents of the tubes substantially to cut-off when no A. C. voltage is applied to the grids. Thus during the negative half cycle, one tube remains inactive while the other tube applies a capacitive reactance to the controlled circuit to decrease its resonant frequency, and during the other half cycle the previously inactive tube applies an effective shunt inductive reactance to the controlled circuit to increase its resonant frequency. The tubes are, therefore, alternately operative, and their average power consumption is lower than that of the same tubes continuously operated. However, the reactance change for a given change of grid voltage is less when the tubes are operated as herein proposed than when both tubes are operating simultaneously, since in the latter case the given grid voltage changes the tubes in directions which have a cumulative effect on the resonant frequency of the controlled circuit.

It is to be noted in Fig. 2 that the shunt reactance of the two tubes is effectively in parallel with inductor 7 and not with inductor 7'. In case a push-pull oscillator is provided, as suggested above, it is desirable to vary the tuning of the entire oscillatory circuit including inductor 7'. A system for accomplishing this is illustrated in Fig. 3, to which reference is now made.

Inductors 7 and 7' are now the halves of a center tapped inductor which constitutes the plate circuit coil of a push pull oscillator 9. Four reactance tubes and four phase shifting networks are employed. The anode electrodes of the first pair of tubes 51, 53 are connected together, and to the ungrounded end of inductor 7. Similarly the anode electrodes of tubes 55, 57 are connected to the ungrounded end of inductor 7'. All the cathodes are grounded. Two of the tubes 51, 55, have their grid electrodes respectively connected to phase shifting networks 59 and 61 which are energized by the voltage across the upper half 7 of the oscillator inductor. The remaining two tubes 53 and 57 have their grid electrodes respectively connected to phase shifting networks 65 and 63, which are energized in phase opposition to the first two named networks by means of the lower half 7' of the oscillator inductor.

The tube conductances are varied, as before, to control the reactive effect, by means of a source of modulating voltage 67. By means of a pair of secondary windings 49 and 51, two out of phase voltages are produced, one of which is impressed on the grids of tubes 51 and 57 through a conductor 69, while the other is impressed on the grids of tubes 53 and 55 through a conductor 71. The amplitudes of the control voltages may be adjusted by means of potentiometers 73 and 75.

It will be recognized that a pair of tubes is connected across each half of the oscillator tuned circuit. Corresponding tubes in each pair are controlled in phase, but in phase opposition to the other pair. Consequently, both halves of the resonant circuit are affected in like sense by the operation of the respective pair of tubes.

One outstanding advantage of the push-pull reactance tube arrangement is that the system is very much more stable than the single tube system. That is, changes in the D. C. plate voltage, screen voltage, bias, and temperature, affect all tubes alike, thus tending to cause like changes in the tubes. However, a change of reactance is obtained only when the tubes are varied oppositely. Consequently, the transferred reactance, and hence the oscillator frequency, is not affected by changes in D. C. potential, and the like.

In the previously described embodiment the anode electrodes have been shown connected in parallel, that is, operated in phase, while the grid electrodes have been energized by quadrature voltages mutually in substantial phase opposition. The reverse of this arrangement is also practical. Thus, considering only tubes 51 and 55 of Fig. 3, for example, out of phase voltages are applied to the anode electrodes, and the grids operated substantially in phase, although it is to be understood that the angle between the grid and anode voltages may be somewhat greater than 90°, as pointed out above.

While I have illustrated my invention in a particular manner, its scope is not to be so limited. Thus the control voltages need not be applied to the control grid electrodes, as illustrated, but may be applied to the screen or suppressor electrodes. Also the phase shifting networks may include inductors instead of capacitors as illustrated. Other changes may be made by those skilled in the art without departing from the spirit of my invention.

I claim as my invention:

1. A variable reactance device comprising a pair of electron discharge tubes having their cathode and anode electrodes coupled to a source of alternating current whose frequency is to be varied; a pair of resistance-capacitance phase shifting networks connected to points of opposite phase on said source for applying voltages to respective grid electrodes, said voltages having phase angles in excess of 90°, lagging and leading, respectively, with respect to the voltage applied to said anode electrodes; and means for relatively varying the amplification of said tubes.

2. A variable reactance device comprising a pair of electron discharge tubes having their cathode and anode electrodes coupled to a source of alternating current; a pair of resistance-capacitance phase shifting networks connected to said source for applying voltages to respective grid electrodes, the phase shift of said networks being such that said voltages have respectively leading and lagging phase angles in excess of 90° with respect to the voltage applied to said anode electrodes; and means for relatively varying the amplification of said tubes.

3. A frequency modulated oscillator comprising an oscillatory circuit including an inductance; a pair of electron tubes having their cathode and anode electrodes connected in parallel across said inductance; a resistance-capacitance phase shifting network for applying to the grid of one of said tubes a voltage which leads the anode voltage of said tube by more than 90°; means including a second resistance-capacitance network for applying to the grid of the other of said tubes a voltage which lags the anode voltage of that tube by more than 90°; and means for relatively varying the amplification of said tubes to vary the resonant frequency of said oscillatory circuit.

4. A frequency modulated oscillator including a tunable circuit in which oscillatory voltages are induced, a pair of electron discharge devices having cathode, grid and anode electrodes; means connecting said cathode and anode electrodes in parallel across said tunable circuit; means for deriving a voltage from said oscillatory voltage and in phase opposition thereto; phase shifting means coupling the grid of one of said tubes to the anode of said tube, phase shifting means for applying said derived voltage to the grid of the other of said tubes; and means for relatively varying the amplification of said tubes.

5. A frequency modulated oscillator including a tunable circuit in which oscillatory voltages are induced, a pair of electron discharge devices having cathode, grid and anode electrodes; means connecting said cathode and anode electrodes in parallel across said tunable circuit; means for deriving a voltage from said oscillatory voltage and in phase opposition thereto; a resistor-capacitor network coupling the grid of one of said tubes to the anode of said one tube; a second resistor-capacitor network for applying said derived voltage to the grid of the other of said tubes; and means for relatively varying the amplification of said tubes.

6. A frequency modulated oscillator including a tunable circuit in which oscillatory voltages are induced, a pair of electron discharge devices having cathode, grid and anode electrodes; means connecting said cathode and anode electrodes in parallel across said turnable circuit; means for deriving a voltage from said oscillatory voltage and in phase opposition thereto; a resistor-capacitor phase shifting network connected between the grid and anode of one of said tubes for applying to said grid a control voltage which leads the voltage of said anode by more than 90°; a second resistor-capacitor network for shifting the phase of said derived voltage less than 90° and applying said voltage to the grid of the other of said tubes; and means for relatively varying the amplification of said tubes.

7. A device of the character described in claim 6 in which said resistor-capacitor networks comprise a plurality of resistors and capacitors connected so as to successively delay said voltages.

8. A frequency modulated oscillator comprising a tunable circuit in which oscillatory voltages are induced, the midpoint of said circuit being a reference potential; a pair of thermionic tubes having cathode, grid and anode electrodes; means connecting said cathode electrodes to said midpoint; means connecting said anode electrodes to one terminal of said tunable circuit; phase shifting means connecting said one terminal to the grid of one of said tubes so that a voltage is induced on said grid which leads the anode voltage of that tube by more than 90°; phase shifting means connecting the other terminal of said tunable circuit to the grid of the other of said tubes so that a voltage is induced on the grid of said other tube which lags the anode voltage of that tube by more than 90°; and means for varying the relative amplification of said tubes to thereby vary the resonant frequency of said tunable circuit.

9. In a device of the character described, a pair of electron discharge tubes having their cathode and anode electrodes connected in parallel across a source of oscillatory voltages; means for applying said oscillatory voltage to the grid electrodes of said tubes in substantially quadrature phase, lagging and leading, respectively, with respect to the voltage of said anode electrodes; biasing means for initially biasing the grid electrodes of said tubes to plate current cut-off; and means responsive to a control potential for oppositely varying the amplification of said tubes to cause one of said tubes to draw plate current during each half cycle of said control potential.

10. A variable reactance comprising a pair of electron discharge tubes having cathode, grid and anode electrodes, said cathode and anode electrodes, respectively, being connected in parallel across a source of oscillatory voltage; means including a pair of resistance-capacitance phase shifting networks connected between points of opposite polarity on said source and said grid electrodes for applying said oscillatory voltage to said grid electrodes in greater than quadrature phase, lagging and leading respectively, with respect to the voltage of said anode electrodes; a source of control voltage; and means for oppositely varying the gain of said tubes in accordance with said control voltage.

LESTER C. SMITH.